United States Patent
Watanabe

(10) Patent No.: US 8,572,592 B2
(45) Date of Patent: Oct. 29, 2013

(54) EXTENDED LANGUAGE SPECIFICATION ASSIGNING METHOD, PROGRAM DEVELOPING METHOD AND COMPUTER-READABLE STORAGE MEDIUM

(75) Inventor: Manabu Watanabe, Kawasaki (JP)

(73) Assignee: Spansion LLC, Sunnyvale, CA (US)

( * ) Notice: Subject to any disclaimer, the term of this patent is extended or adjusted under 35 U.S.C. 154(b) by 1655 days.

(21) Appl. No.: 11/350,072

(22) Filed: Feb. 9, 2006

(65) Prior Publication Data
US 2007/0083852 A1    Apr. 12, 2007

(30) Foreign Application Priority Data
Oct. 12, 2005   (JP) .................................. 2005-297866

(51) Int. Cl.
*G06F 9/45*   (2006.01)

(52) U.S. Cl.
USPC .......................................... 717/152; 717/106

(58) Field of Classification Search
None
See application file for complete search history.

(56) References Cited

U.S. PATENT DOCUMENTS

| | | | |
|---|---|---|---|
| 5,659,752 A * | 8/1997 | Heisch et al. | 717/158 |
| 5,815,720 A * | 9/1998 | Buzbee | 717/158 |
| 6,931,630 B1 * | 8/2005 | Cotner et al. | 717/126 |
| 7,191,436 B1 * | 3/2007 | Durr et al. | 717/170 |
| 7,565,376 B2 * | 7/2009 | Stegmann et al. | 1/1 |
| 2002/0062475 A1 * | 5/2002 | Iborra et al. | 717/108 |
| 2002/0066086 A1 * | 5/2002 | Linden | 717/145 |
| 2003/0005423 A1 * | 1/2003 | Chen et al. | 717/154 |
| 2003/0110481 A1 | 6/2003 | Wada et al. | |
| 2004/0133875 A1 * | 7/2004 | Kramer | 717/101 |
| 2006/0064670 A1 * | 3/2006 | Linebarger et al. | 717/106 |

FOREIGN PATENT DOCUMENTS

| | | |
|---|---|---|
| JP | 6-110670 | 4/1994 |
| JP | 2003-173262 A | 6/2003 |

OTHER PUBLICATIONS

"Japanese Office Action" mailed by JPO and corresponding to Japanese application No. 2005-297866 on Mar. 29, 2011, with partial English translation.

* cited by examiner

*Primary Examiner* — Jason Mitchell
(74) *Attorney, Agent, or Firm* — Sterne, Kessler, Goldstein & Fox P.L.L.C.

(57) ABSTRACT

An extended language specification assigning method assigns an extended language specification with respect to an object of a program, by analyzing candidates of the extended language specification, and automatically assigning an extended language specification with respect to an object based on the analyzed result.

12 Claims, 12 Drawing Sheets

FIG.8

| FUNCTION (EXTENDED ASSIGNMENT) | VARIABLE NAME (EXTENDED ASSIGNMENT) | FILE NAME |
|---|---|---|
| SUB1 | i(_spec) | a.c |
| SUB2 | j | |
| | k(_spec) | c.c |
| FUNC(#pragma SPEC) | l(_spec) | b.c |
| | m(_spec) | |
| | n | |

FIG.9

| PROJECT NAME (EXTENDED ASSIGNMENT) | FILE NAME (EXTENDED ASSIGNMENT) |
|---|---|
| prj1 | a.c |
| | b.c(-spec) |
| | c.c |
| prj4(-spec) | x.c |
| | y.c |
| | z.c |

FIG.10

| FUNCTION (EXTENDED ASSIGNMENT) | VARIABLE NAME (EXTENDED ASSIGNMENT) | FILE NAME (EXTENDED ASSIGNMENT) |
|---|---|---|
| SUB1 | i(_spec) | a.c |
| SUB2 | j | |
| | k(_spec) | c.c |
| FUNC(#pragma SPEC) | l(_spec) | b.c(-spec) |
| | m(_spec) | |
| | n | |

FIG.11

BLANK PORTIONS INDICATE CANDIDATES

| VARIABLE NAME | FUNCTION | VARIABLE | COMMAND | WARNING |
|---|---|---|---|---|
| i |  | __spec |  |  |
| j |  |  |  |  |
| k |  | __spec |  |  |
| l | #pragma | __spec | __spec | TRIPLE OVERLAP |
| m | #pragma | __spec |  | DOUBLE OVERLAP |
| n | #pragma |  |  |  |

FIG.12

- ● ONLY FUNCTIONS
- ○ ONLY VARIABLES
- ○ ONLY COMMANDS

FIG.13

| VARIABLE NAME | FUNCTION |
|---|---|
| l | #pragma |
| m | #pragma |
| n | #pragma |

FIG.15

"Recommended" recommends assignment by option

"Source" indicates assignment within source program

Assigned by both "Source" & "Option"

"*" indicates assignment by "Option"

| Setting | Candidate | Static Attribute | Type | Variable Name | File Name | Path Name |
|---|---|---|---|---|---|---|
|  | Recommended | Function | char * | word | LEXSTR.C | C:¥sam |
| * | Source |  | direct unsign... | d_uc | direct.h | C:¥sam |
| * | Source |  | direct char... | d_c | direct.h | C:¥sam |
| * | Source |  | direct unsign... | d_usi | direct.h | C:¥sam |
| * | Source |  | direct short... | d_si | direct.h | C:¥sam |
| * | Recommended |  | direct_t | DirAtrb | direct.h | C:¥sam |
| * | Recommended |  | option_t | OptAtrb | MAIN.C | C:¥sam |
| * | Source |  | direct float | d_f | direct.h | C:¥sam |
| * | Source |  | direct unsign... | d_uli | direct.h | C:¥sam |
| * | Source |  | direct long... | d_li | direct.h | C:¥sam |
| * | Recommended |  | chkstr_t | StrAtrb | MAIN.C | C:¥sam |
| * | Source |  | direct long d... | d_ld | direct.h | C:¥sam |
| * | Recommended |  | struct table [16] | target | sample.c | C:¥sam |
| * | Recommended |  | int | d_d | sample.c | C:¥sam |
| * | Recommended |  | int | i | REWRITE.C | C:¥sam |

ASSIGNABLE RANGE

_direct inspection

Setting 414 bytes | Select | 2 bytes | Setting

EXTENDED LANGUAGE SPECIFICATION ASSIGNING METHOD, PROGRAM DEVELOPING METHOD AND COMPUTER-READABLE STORAGE MEDIUM

BACKGROUND OF THE INVENTION

1. Field of the Invention

The present invention generally relates to extended language specification assigning methods, program developing methods and computer-readable storage media, and more particularly to an extended language specification assigning method for assigning an extended language specification with respect to an arbitrary object within a program, a program developing method that uses such an extended language specification assigning method, and a computer-readable storage medium which stores a program for causing a computer to execute such an extended language specification assigning method or program developing method. The present invention also relates to a program for causing a computer to execute such an extended language specification assigning method or program developing method.

2. Description of the Related Art

A compiler for a high-level language such as the C language is provided with an extended language specification for generating executing programs that are suited for a program executing environment of a processor such as a CPU, memory and the like. By assigning the extended language specification at a particular portion of a program, it is possible to reduce a memory capacity that is required to store the program.

However, due to the recent increase of the program scale, the portions of the program where the extended language specification is to be assigned are scattered within a large range, and it is difficult to confirm whether or not the extended language specification is assigned at effective and appropriate portions of the program when the entire program is taken into consideration.

Methods of assigning the extended language specification include a method of making a description of the extended language specification within a source program, a method of assigning the extended language specification in a particular source program as a command line option, and a method of assigning the extended language specification with respect to all source programs as a whole. But it is difficult to confirm the object with respect to which the extended language specification is actually assigned, and it is difficult to confirm whether or not the program is correctly compiled as specified by the extended language specification.

In addition, when the tradeoff between the portions within the program where the extended language specification has already been assigned and the portions where the extended language specification is to be assigned is taken into consideration, it is desirable to be able to constantly grasp all portions within all programs where a particular extended language specification is assigned.

FIG. 1 is a flow chart for explaining an example of a conventional program developing method. In FIG. 1, when the program development is started, a step S101 creates a new project. A step S102 makes various settings with respect to the program developing environment. A step S103 creates a source program using an extended language specification that is manually assigned by a user (program developer) in a step S121. A step S104 makes optional settings using the extended language specification that is manually assigned by the user in the step S121. A step S105 builds the program according to the assignment of the extended language specification, that is, compiles the program to create a target program.

A step S106 decides whether or not a building error is generated by the assignment made by the extended language specification. For example, the building error is generated by overlapping assignments of the extended language specification and the like. If the decision result in the step S106 is YES, a step S107 decides whether or not the cause of the building error is in the source program. If the decision result in the step S107 is YES, a step S108 corrects the source program, and the process returns to the step S102. On the other hand, if the decision result in the step S107 is NO, a step S109 decides whether or not the cause of the building error is in the option. If the decision result in the step S109 is YES, a step S110 changes the option, and the process returns to the step S102. If the decision result in the step S109 is NO, the process returns to the step S102.

If the decision result in the step S106 is NO, a step S111 executes the program using a simulator or an emulator. A step S112 measures an executing performance of the executed program. A step S113 decides whether or not the executing performance of the executed program is good, that is, a tolerable performance or better. If the decision result in the step S113 is NO, a step S114 decides whether or not the cause of the poor executing performance of the program is in the source program. If the decision result in the step S114 is YES, a step S115 corrects the source program, and the process returns to the step S102. On the other hand, if the decision result in the step S114 is NO, a step S116 decides whether or not the poor executing performance of the program is caused by the option. If the decision result in the step S116 is YES, a step S117 changes the option, and the process returns to the step S102. If the decision result in the step S116 is NO, the process returns to the step S102. The program development ends if the decision result in the step S113 is YES.

The source program, the option and the program developing environment mutually interact, and for this reason, the user must make manual adjustments while taking into consideration the mutual effects thereof. Accordingly, it is desirable that the user is a skilled person who is knowledgeable in the extended language specification and the like.

A Japanese Laid-Open Patent Application No. 6-110670 proposes a graphic user interface function customizing system that can acquire events by event acquisition commands in the extended language.

Conventionally, there exists no means that can constantly grasp all portions within all programs where a particular extended language specification is assigned. As a result, it is difficult to effectively utilize the extended language specification.

In addition, the methods of assigning the extended language specification include assigning the translation option to be applied to the entire project or the source program, assigning with respect to the source program by a #pragma preprocessing command or the like, and assigning with respect to a particular object by a local scope within the source program, a type modifier or the like. When such assignments overlap, there is a possibility that a grammatical error, a linkage error, an execution error and the like will occur.

Therefore, it is conventionally difficult to efficiently assign the extended language specification, and difficult to grasp the assigned state of the extended language specification. Consequently, it is difficult to suppress the overlapping assignments, and thus difficult to effectively utilize the extended language specification.

SUMMARY OF THE INVENTION

Accordingly, it is a general object of the present invention to provide a novel and useful extended language specification assigning method, program developing method, program and computer-readable storage medium, in which the problems described above are suppressed.

Another and more specific object of the present invention is to provide an extended language specification assigning method, a program developing method, a program and a computer-readable storage medium, which can efficiently assign the extended language specification, suppress the overlap of assignments by enabling the assigned state of the extended language specification to be grasped, and efficiently utilize the extended language specification.

Still another object of the present invention is to provide an extended language specification assigning method for assigning an extended language specification with respect to an object of a program, comprising an analyzing step analyzing candidates of the extended language specification; and an assigning step automatically assigning an extended language specification with respect to an object, based on an analyzed result of the analyzing step. According to the extended language specification assigning method of the present invention, it is possible to efficiently assign the extended language specification, suppress the overlap of assignments by enabling the assigned state of the extended language specification to be grasped, and efficiently utilize the extended language specification.

A further object of the present invention is to provide a program developing method comprising an analyzing step analyzing candidates of an extended language specification; an assigning step automatically assigning an extended language specification with respect to an object, based on an analyzed result of the analyzing step; and a creating step creating a program including the extended language specification that is assigned. According to the program developing method of the present invention, it is possible to efficiently assign the extended language specification, suppress the overlap of assignments by enabling the assigned state of the extended language specification to be grasped, and efficiently utilize the extended language specification.

Another object of the present invention is to provide a computer-readable storage medium that stores a computer program for causing a computer to execute an extended language specification assigning method for assigning an extended language specification with respect to an object of a program, the computer program comprising an analyzing procedure causing the computer to analyze candidates of the extended language specification; and an assigning procedure causing the computer to automatically assign an extended language specification with respect to an object, based on an analyzed result of the analyzing procedure. According to the computer-readable storage medium of the present invention, it is possible to efficiently assign the extended language specification, suppress the overlap of assignments by enabling the assigned state of the extended language specification to be grasped, and efficiently utilize the extended language specification.

Still another object of the present invention is to provide a computer-readable storage medium that stores a computer program for causing a computer to execute a program developing method, the computer program comprising an analyzing procedure causing the computer to analyze candidates of an extended language specification; an assigning procedure causing the computer to automatically assign an extended language specification with respect to an object, based on an analyzed result of the analyzing procedure; and a creating procedure causing the computer to create a program including the extended language specification that is assigned. According to the computer-readable storage medium of the present invention, it is possible to efficiently assign the extended language specification, suppress the overlap of assignments by enabling the assigned state of the extended language specification to be grasped, and efficiently utilize the extended language specification.

Other objects and further features of the present invention will be apparent from the following detailed description when read in conjunction with the accompanying drawings.

BRIEF DESCRIPTION OF THE DRAWINGS

FIG. 8 is a diagram showing a symbol table;

FIG. 9 is a diagram showing a list of source programs;

FIG. 10 is a diagram showing a merged result;

FIG. 11 is a diagram showing a search result of candidates of the extended language specification;

FIG. 12 is a diagram for explaining a condition setting;

FIG. 13 is a diagram showing a search result of optimized candidates;

FIG. 15 is a diagram showing a _direct inspection window; and

DESCRIPTION OF THE PREFERRED EMBODIMENTS

In the present invention, a portion where an extended language specification may be assigned is preassigned, and a priority and an inclusion relationship of the assignments are defined, so as to create a mechanism for constantly judging whether or not the assignment is efficient from the point of view of the entire project whenever the assignment of the extended language specification is made.

In addition, the assigned state of the extended language specification is displayed in an easily understandable manner, for example, so that the appropriateness of the assignment of the extended language specification is easily understandable from the point of view of the entire project.

A description will now be given of embodiments of the extended language specification assigning method, program developing method, program and computer-readable storage medium according to the present invention, by referring to FIG. 2 and the subsequent drawings.

Figure 1:
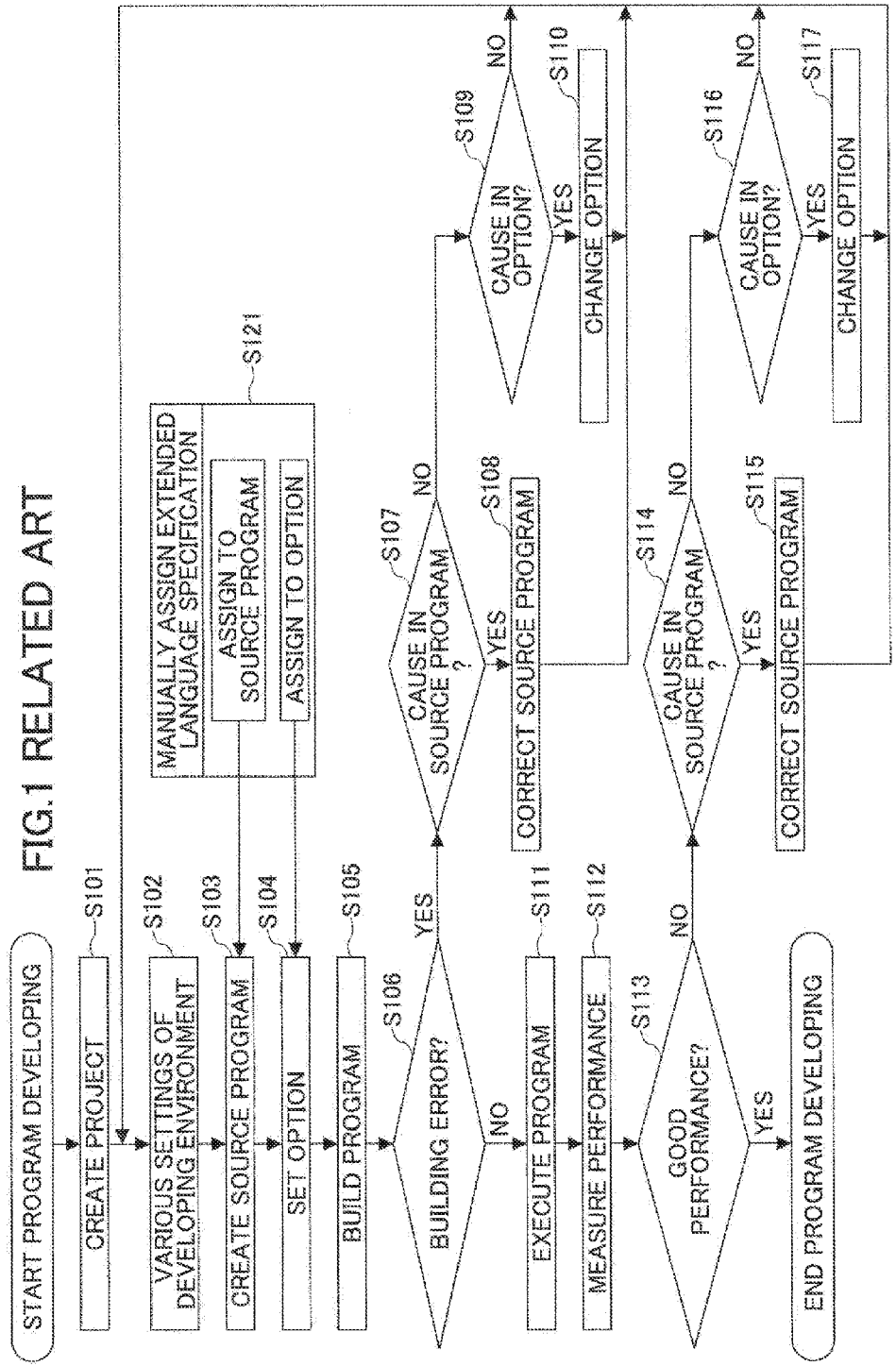
FIG. 1 is a flow chart for explaining an example of a conventional program developing method.
Figure 2:
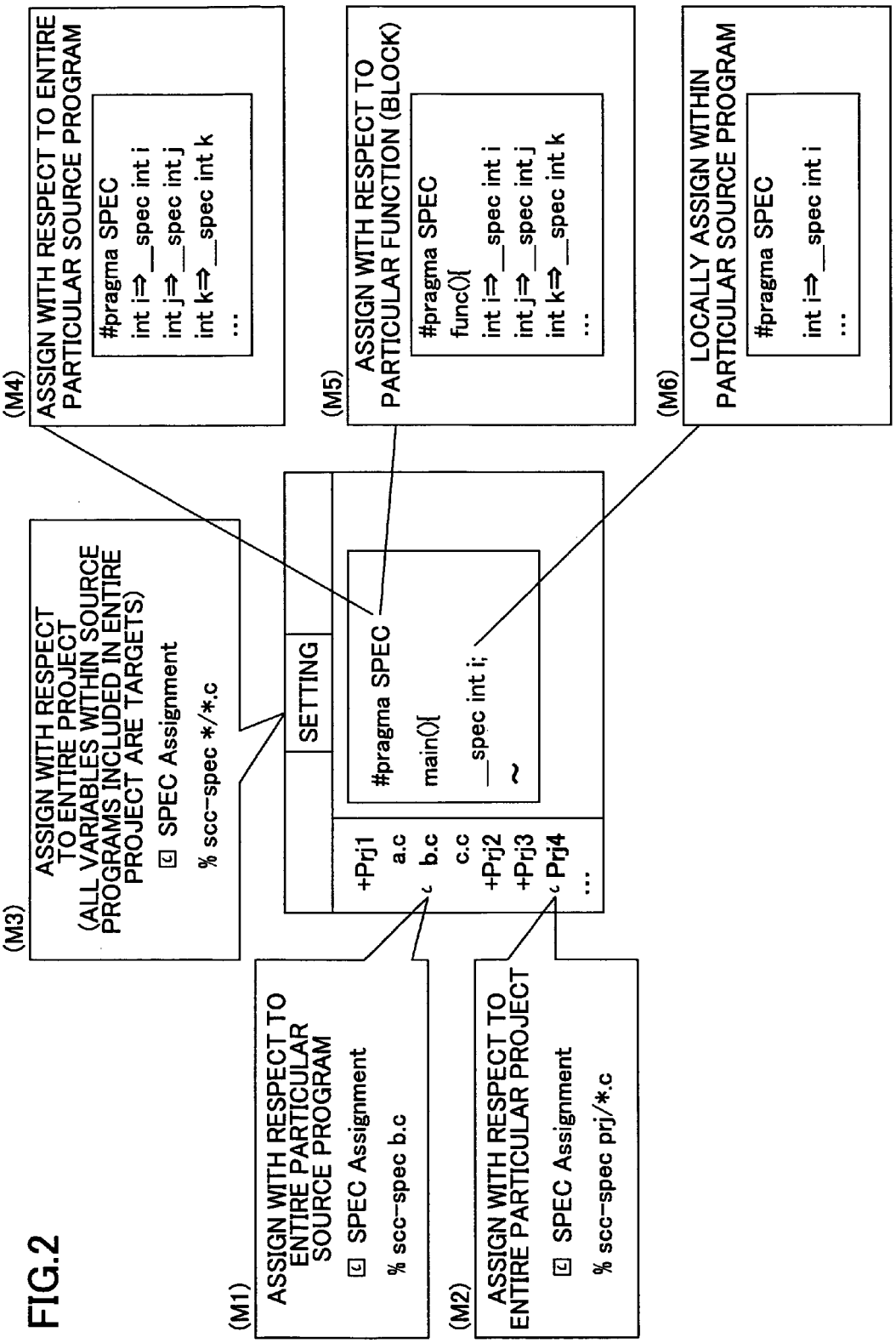
FIG. 2 is a diagram for explaining an assignment of an extended language specification.

FIG. 2 is a diagram for explaining the assignment of the extended language specification. Although FIG. 2 mainly represents variables, it is of course possible to assign the extended language specification of functions and the like.

When assigning the extended language specification to a particular variable, extended language assigning methods using interfaces such as those described as methods (M1) through (M6) below are conceivable. It is assumed for the sake of convenience that the assigning of the extended language specification is made by a modifier "_spec" linked to improved performance or, a compile option assignment "-spec", which will hereinafter be referred to as "SPEC" assignment.

The method (M1) makes the "-spec" assignment with respect to the entire particular source program in a project window shown in FIG. 2, so that all variables included in the particular source program become targets of the "SPEC" assignment.

The method (M2) makes the "-spec" assignment with respect to the entire particular project in the project window shown in FIG. 2, so that all variables included in the particular project become targets of the "SPEC" assignment.

The method (M3) makes the "-spec" assignment with respect to all projects in the project window shown in FIG. 2, so that all variables included in all projects become targets of the "SPEC" assignment.

The method (M4) makes the assignment within the source program with respect to the entire particular source program in an editor window shown in FIG. 2, so that all variables included in the particular source program become targets of the "SPEC" assignment.

The method (M5) makes the assignment with respect to a particular function or block within the particular source program in the editor window shown in FIG. 2, so that all variable included in the particular function or block become targets of the "SPEC" assignment.

The method (M6) makes the assignment directly with respect to a particular variable within the particular source program in the editor window shown in FIG. 2, so that all variables that are assigned become targets of the "SPEC" assignment.

The case shown in FIG. 2 may be summarized as a compile option or, an assignment of the extended language specification within the source program, but the means for assigning the extended language specification is confusing in the state as it is, and it is difficult to understand which of the objects, such as the variables and the functions, are finally assigned the extended language specification. In addition, if a "_spec" assignment is to be made with respect to a variable "int i" within particular source programs b and c, for example, it may be that the "_spec" assignment has already been made with respect to the entire particular source program, the entire particular object or, the entire project.

In such a case, there is a possibility of making overlapping assignments even though the extended language specification has already been assigned or, generating a secondary effect such as making the assignment with respect to a non-intended variable. In addition, it is difficult to understand the manner in which the "SPEC" assignment has been made. Furthermore, if the portions of the program where the extended language specification is to be assigned are scattered within a large range due to an increase in the program scale, it is difficult to confirm whether or not a restriction has been exceeded when an absolute number of options is restricted.

Accordingly, in an embodiment of the present invention, the "SPEC" assignment information within the program developing environment for the methods (M1) through (M3) is shared, and the source program within the project is analyzed and candidate variable information is gathered in advance for the methods (M4) through (M6), so that it is possible to grasp all portions where the assignment of the extended language specification is made.

Figure 3:
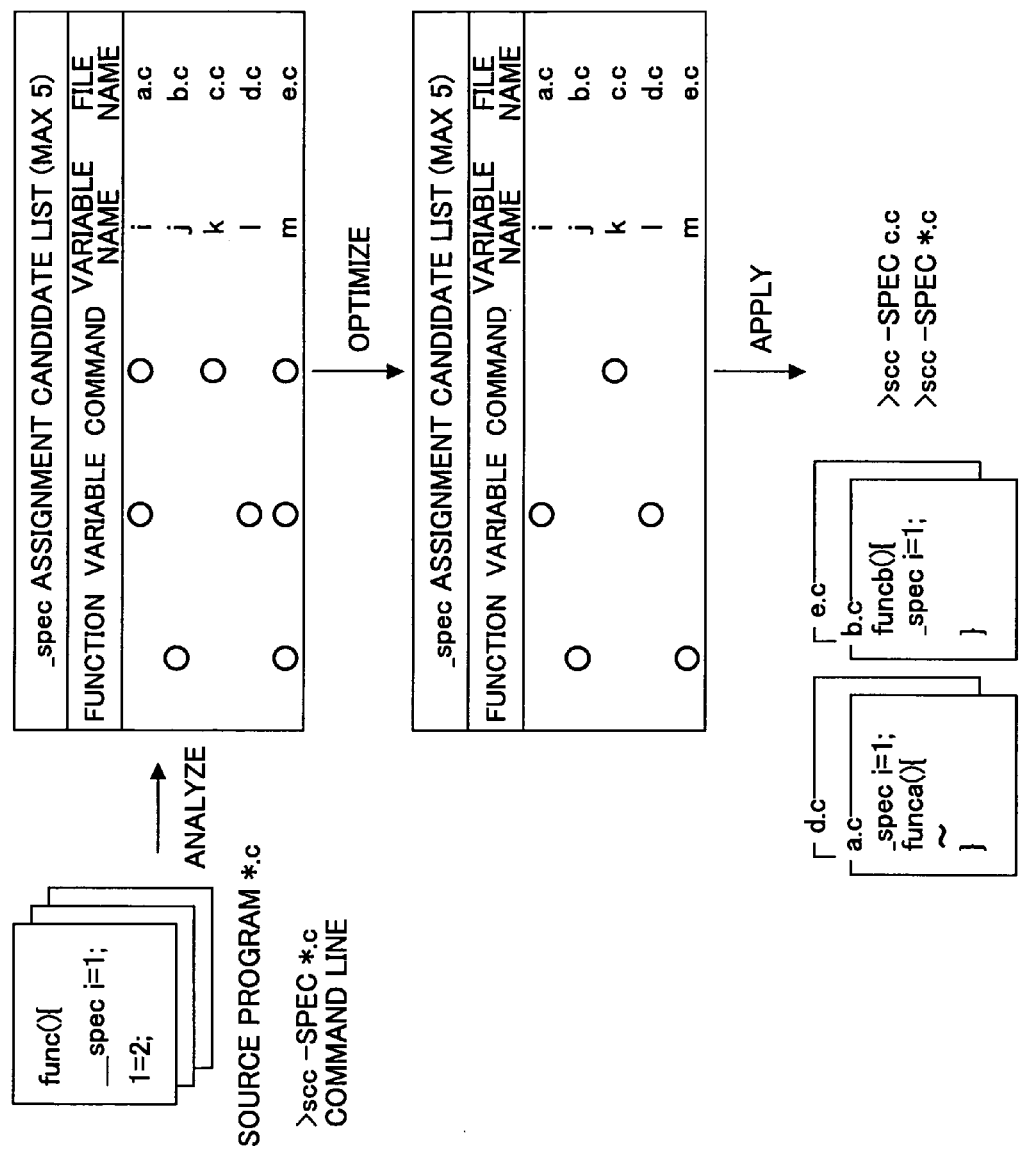
FIG. 3 is a diagram for explaining analysis, optimization and application of the assignment of the extended language specification.

FIG. 3 is a diagram for explaining analysis, optimization and application of the assignment of the extended language specification. As shown in FIG. 3, for example, under a condition in which the assignment of the extended language specification is possible for only up to 5 variables (MAX 5) due to the variable region size, the number of assignments and the like, the command line of the source program prior to the compiling is analyzed, so as to display a list of the function with respect to the particular variable, the variable (direct modifying) and the assigned state for the command option. A _spec assignment candidate list shown in FIG. 3 indicates the function, the variable, the command, the variable name and the file name (source program name).

By additionally confirming the assigned ate of the "SPEC" assignment with respect to each variable information, it is also possible to grasp the overlapping assignments. Moreover, from the analyzed result, it may be seen that the "SPEC" assignment is made with respect to the variable "i" of a source program "a.c" both as a variable and a command and is thus redundant. Similarly, the "SPEC" assignment is made with respect to a variable "m" of a source program "e.c" as a function, a variable and a command and is thus redundant. By displaying such variables with the overlapping assignments in an emphasized manner, for example, it is possible to warn or caution the user of the overlapping assignments.

Furthermore, by prescribing in advance the priorities and the assignment patterns of the assignments for the case where the overlapping assignments are made, it is possible to optimize the _spec assignment candidate list which is the analyzed result. The secondary effects are small and there are no effects on the other variables if a pin-point assignment is made by the function. Hence, by setting in advance the conditions depending on the characteristics of the extended language specification, it becomes possible to make the "SPEC" assignment only for a minimum number of variables by optimizing the analyzed result. From the optimized result, it may be seen that the "SPEC" assignment is made with respect to the variable "i" of the source program "a.c" only as a variable, the "SPEC" assignment is made with respect to the variable "m" of the source program "e.c" only as a function, and there are no overlapping assignments.

It is possible to provide a function of realizing the "SPEC" assignment solely by a particular one of all of the "SPEC" assignment methods. It is possible to add conditions related to the quality, maintenance and the like, and provide conditions in which the source program is not edited such as permitting only commands.

After optimizing the analyzed result of the candidates of the extended language specification, the optimized candidates of the extended language specification are applied, that is, assigned with respect to the source program or the option.

In this embodiment, the assignment of the extended language specification is automatically made based on the analyzed result of the candidates of the extended language specification. Hence, it is possible to suppress unnecessary assignment of the extended language specification, suppress errors caused by overlapping assignments, and validate only the assignment of the extended language specification having appropriate effects. Accordingly, it is possible to improve the maintainability of the program, and to improve the consistency of the assignment of the extended language specification. It is possible to efficiently assign the extended language specification particularly in cases where the number of times the extended language specification can be assigned is limited and in cases where restrictions are generated with respect to the program performance or the program size by the assignment of the extended language specification. Furthermore, it is possible to avoid the assignment of the extended language specification from being omitted where actually necessary, because it is possible to uniquely grasp the objects of all programs that can assign a particular extended language specification or, the objects of programs that have already assigned the particular extended language specification.

Therefore, it is possible to avoid conflicts between the assignment of the extended language specification assigned within the source program and the assignment of the extended language specification assigned by the option. It is not only possible to reduce unnecessary assignment of the extended language specification, but to also grasp all assignment targets of the extended language specification, thereby making it possible to efficiently and positively assign the extended language specification. In addition, it is possible to easily realize maintenance and structural management conditions, such as not correcting the source program and embedding all assignments within the source program, if necessary.

Figure 4:
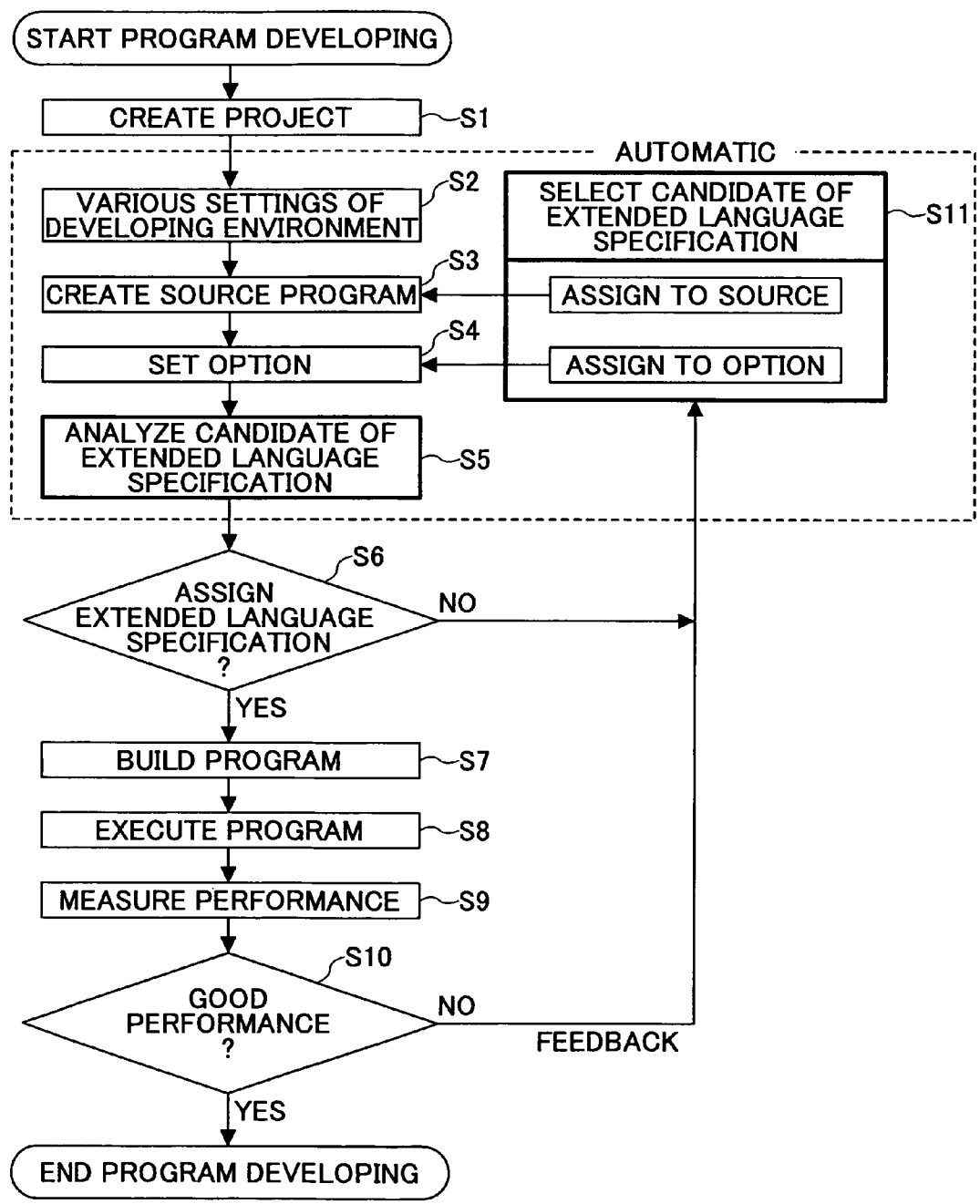
FIG. 4 is a flow chart for explaining an embodiment of a program developing method according to the present invention.

FIG. 4 is a flow chart for explaining an embodiment of the program developing method according to the present invention. This embodiment of the program developing method employs an embodiment of the extended language specification assigning method according to the present invention.

The program according to the present invention causes a computer to execute the extended language specification assigning method or the program developing method. The computer-readable storage medium according to the present invention is formed by a recording medium that stores the program according to the present invention. The recording medium may be formed by any suitable media capable of storing the program in a computer-readable manner, such as optical recording media, magneto-optical recording media, magnetic recording media and semiconductor memory devices.

The process shown in FIG. 4 is executable by a general-purpose computer system comprising a processor such as a CPU, a storage part such as a memory, an input part such as a keyboard, a display part and the like.

Figure 5:
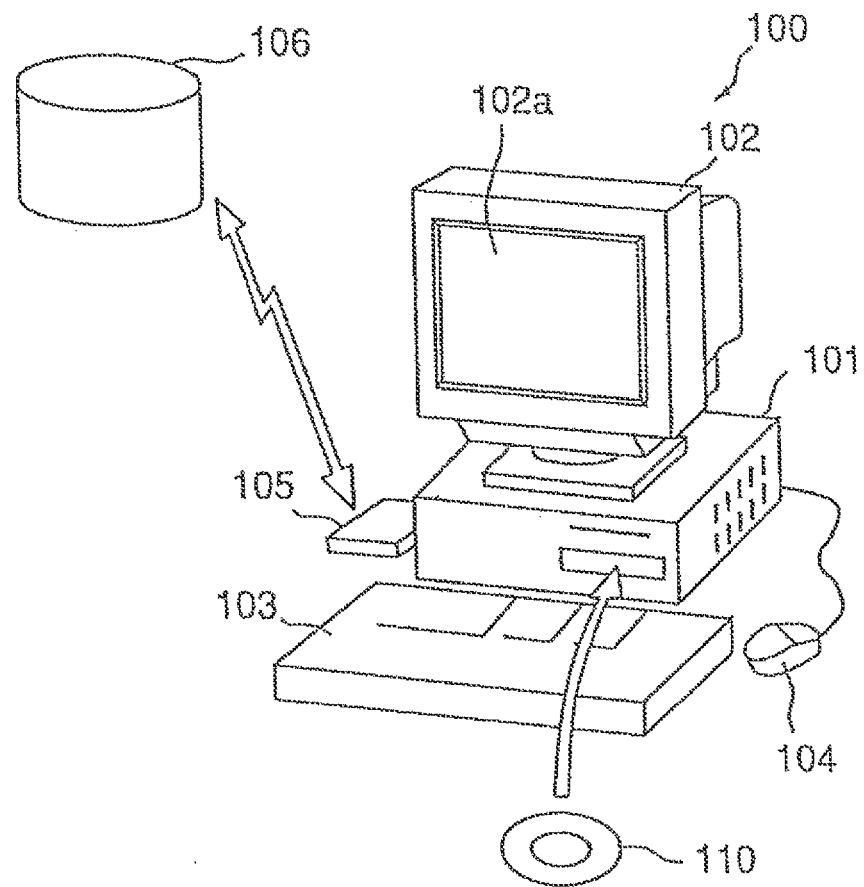
FIG. 5 is a perspective view showing a computer system.

FIG. 5 is a perspective view showing a computer system. As shown in FIG. 5, a computer system 100 includes a main body 101, a display part 102, a keyboard 103, a mouse 104 and a modem 105. The main body 101 includes a CPU, a disk drive and a storage part such as a memory. The display part 102 displays a screen, image, menu and the like on a display screen 102a in response to an instruction from the main body 101. The keyboard 103 is operated by the user when inputting various information and instructions to the computer system 100. The mouse 104 is operated by the user when specifying an arbitrary position on the display screen 102a, for example. The modem 105 is used when making access to an external database or the like and downloading a program or the like stored in another computer system to the computer system 100, for example. The programs that are executed by the CPU are may be stored in a portable recording medium such as a disk 110 or, downloaded from a recording medium (or a storage part) 106 of another computer system using a communication unit such as the modem 105.

In FIG. 4, when the program developing process is started, a step S1 creates a new project. A step S2 makes various settings with respect to the program developing environment. For example, the various settings with respect to the program developing environment include setting the kind of processor, compiler option and the like. A step S3 creates a source program using a candidate of the extended language specification that is assigned by a step S11 which will be described later. A step S4 makes optional settings using the candidate of the extended language specification that is assigned by the step S11. A step S5 analyzes the candidate of the extended language specification.

A step S6 decides whether or not to assign the extended language specification. If the decision result in the step S6 is YES, a step S7 builds the program according to the assignment of the extended language specification, that is, compiles the program to create a target program. A step S8 executes the program using a simulator or an emulator. A step S9 measures an executing performance of the executed program. The executing performance that is measured may be the number of cycles by which the program is executed, the percentage of the run time occupied by the program, and the like. A step S10 decides whether or not the executing performance of the executed program is good, that is, a tolerable performance or better. The program developing process ends if the decision result in the step S10 is YES.

The process advances to the step S11 if the decision result in the step S6 or S10 is NO. The step S11 selects the candidate of the extended language specification based on the analyzed result of the candidate of the extended language specification obtained in the step S5 and the measured result of the executing performance of the executed program obtained in the step S9 (when the executing performance is not good), and assigns the selected candidate of the extended language specification with respect to the steps S3 and S4 described above. In other words, if the executing performance of the program is lower than the tolerable performance and the decision result in the step S10 is NO, the step S11 changes or corrects the selection of the candidate of the extended language specification so that the executing performance of the program becomes the tolerable performance or better.

In this embodiment, the integrated control of the selection alternatives for the source program, the option and the program developing environment is carried out by the steps S2 through S5 and S11 that are surrounded by dotted lines in FIG. 4. In addition, the selection of the candidate of the extended language specification and the assignment of the extended language specification by the selected candidate are carried out automatically by the steps S2 through S5 and S11 that are surrounded by dotted lines in FIG. 4. After automatically selecting the candidate of the extended language specification, the selected candidate may be manually changed by the user. But even in such a case, the initial selection of the candidate is carried out automatically, and in this specification, a reference to the "automatic selection of the candidate of the extended language specification" or the "automatic assignment of the extended language specification" is intended to also include such a case.

No building error is generated because the candidates of the extended language specification are analyzed in advance. In addition, no discrepancy is generated in the assignment of the extended language specification, because the selection of the candidate of the extended language specification and the assignment of the extended language specification are made automatically.

Even in a case where the selection of the candidate of the extended language specification is carried out over again depending on whether the executing performance of the executed program is good or not, the selection of the candidate of the extended language specification and the assignment of the extended language specification are made automatically. Hence, also in this case, no discrepancy is generated in the assignment of the extended language specification.

Figure 6:
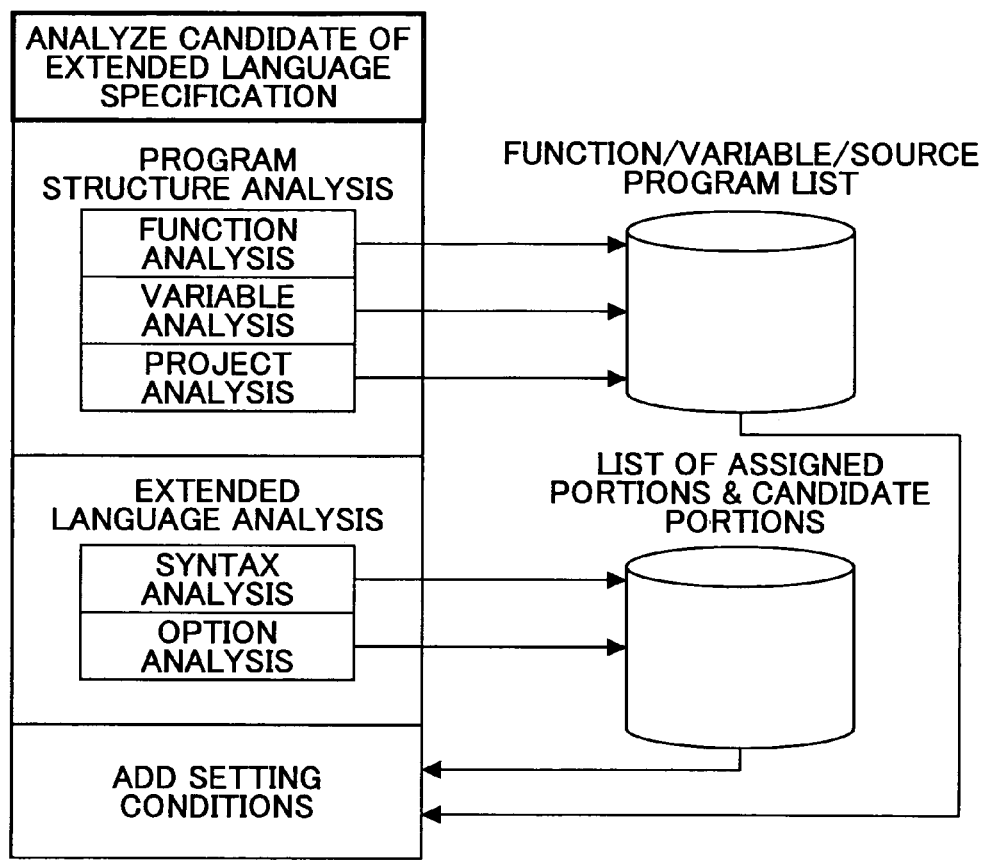
FIG. 6 is a diagram for explaining an analysis of a candidate of an extended language specification.

FIG. 6 is a diagram for explaining the analysis of the candidate of the extended language specification by the step S5. As shown in FIG. 6, the analysis of the candidate of the extended language specification includes a program structure analysis, an extended language analysis and an addition of setting conditions. The program structure analysis may be realized by an existing tool, and includes a function analysis, a variable analysis and a project analysis. The result of the program structure analysis is stored in the storage part as a list of functions, variables and source programs. The extended language analysis may be realized by an existing tool, and includes a syntax analysis and an option analysis. The result of the extended language analysis is stored in the storage part as a list of assigned portions and candidate portions. The addition of the setting conditions may be realized by an existing tool, and includes the adding of language specification conditions, candidate portions, functions, variables, source programs and the like. The program structure analysis and the extended language analysis may be realized by separate routines as shown in FIG. 6 or, realized by a single routine.

The analysis of the candidate of the extended language specification may be carried out by a mechanism within an existing integrated developing environment, to output the state of the analyzed result in the form of a graphical user interface (GUI), to check the overlapping assignments, to make an optimization, to set conditions and the like.

Figure 7:
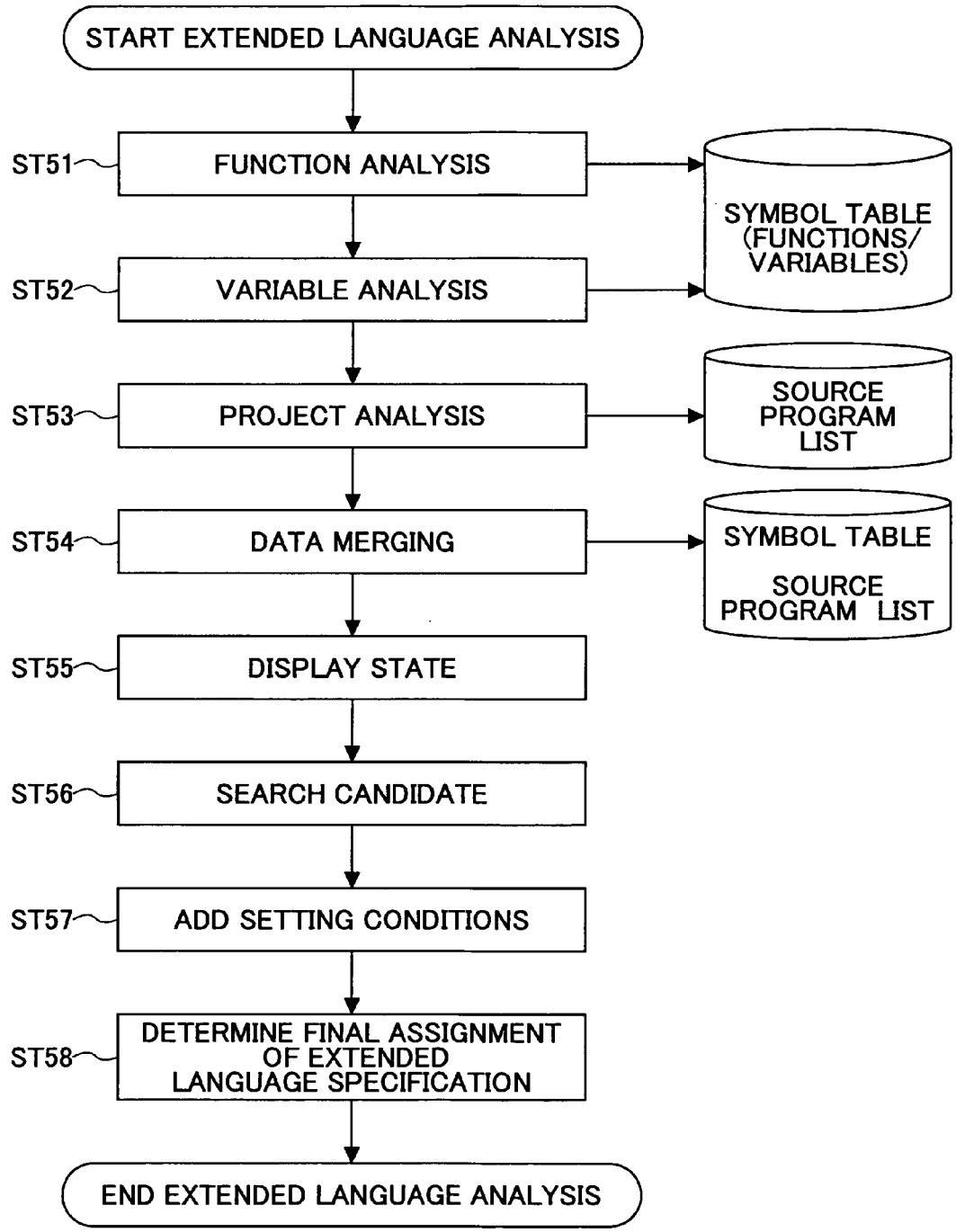
FIG. 7 is a flow chart for explaining the analysis of the candidate of the extended language specification.

FIG. 7 is a flow chart for explaining the analysis of the candidate of the extended language specification by the step S5. FIG. 7 shows a case where the program structure analysis and the extended language analysis are realized by a single routine.

In FIG. 7, when the analysis of the candidate of the extended language specification is started, a step ST51 carries out a function analysis and a step ST52 carries out a variable analysis, using the structural analysis and the extended language analysis of the compiler. Hence, a list of the functions and variables, obtained as the analyzed result, is stored in the storage part as a symbol table shown in FIG. 8 in a form that includes a list of the assigned portions and the candidate portions. The symbol table shown in FIG. 8 includes functions, variable names and file names (or program names). A step ST53 carries out a project analysis. Accordingly, the analyzed result is stored in the storage part as a list of source programs shown in FIG. 9 in a form that includes the assigned portions and the candidate portions. The list of the source programs shown in FIG. 9 includes project names and file names. In FIGS. 8 and 9 and FIG. 10 which will be described later, "Extended Assignment" indicates the assignment of the extended language specification.

A step ST54 merges the symbol table and the list of source program by the variable names, and obtains a merged result shown in FIG. 10. A step ST55 makes a state display by displaying the merged result shown in FIG. 10 on the display part. The merged result shown in FIG. 10 includes functions, variable names and file names.

A step ST56 searches for the candidates of the extended language specification based on the merged result, and displays a search result shown in FIG. 11 on the display part. The search result shown in FIG. 11 includes variable names, functions, variables, commands and warnings. For example, a variable "1" can assign the extended language specification as a function, a variable and a file (program). In FIG. 11, blanks indicated by oval portions indicate the candidates. In addition, if overlap information such as "Triple Overlap" and "Double Overlap" is indicated in the warning column, it is possible to recognize the overlapping assignments of the extended language specification.

A step ST57 adds the setting conditions such as the language specification conditions, the candidate portions, the functions, the variables and the source programs. In this case, it is possible to make a condition setting in advance that sets a condition to select only the functions on the screen of the display part, as indicated in FIG. 12, for example. FIG. 12 shows the display screen for a case where "only functions", "only variables" and "only commands" are selectable as the condition by the condition setting.

A step ST58 determines the final assignment of the extended language specification. Hence, the search result shown in FIG. 11 is optimized as shown in FIG. 13 by the condition setting shown in FIG. 12, and the analysis of the candidate of the extended language specification ends. FIG. 13 shows the variable names and functions that are optimized candidates of the extended language specification.

Figure 14:
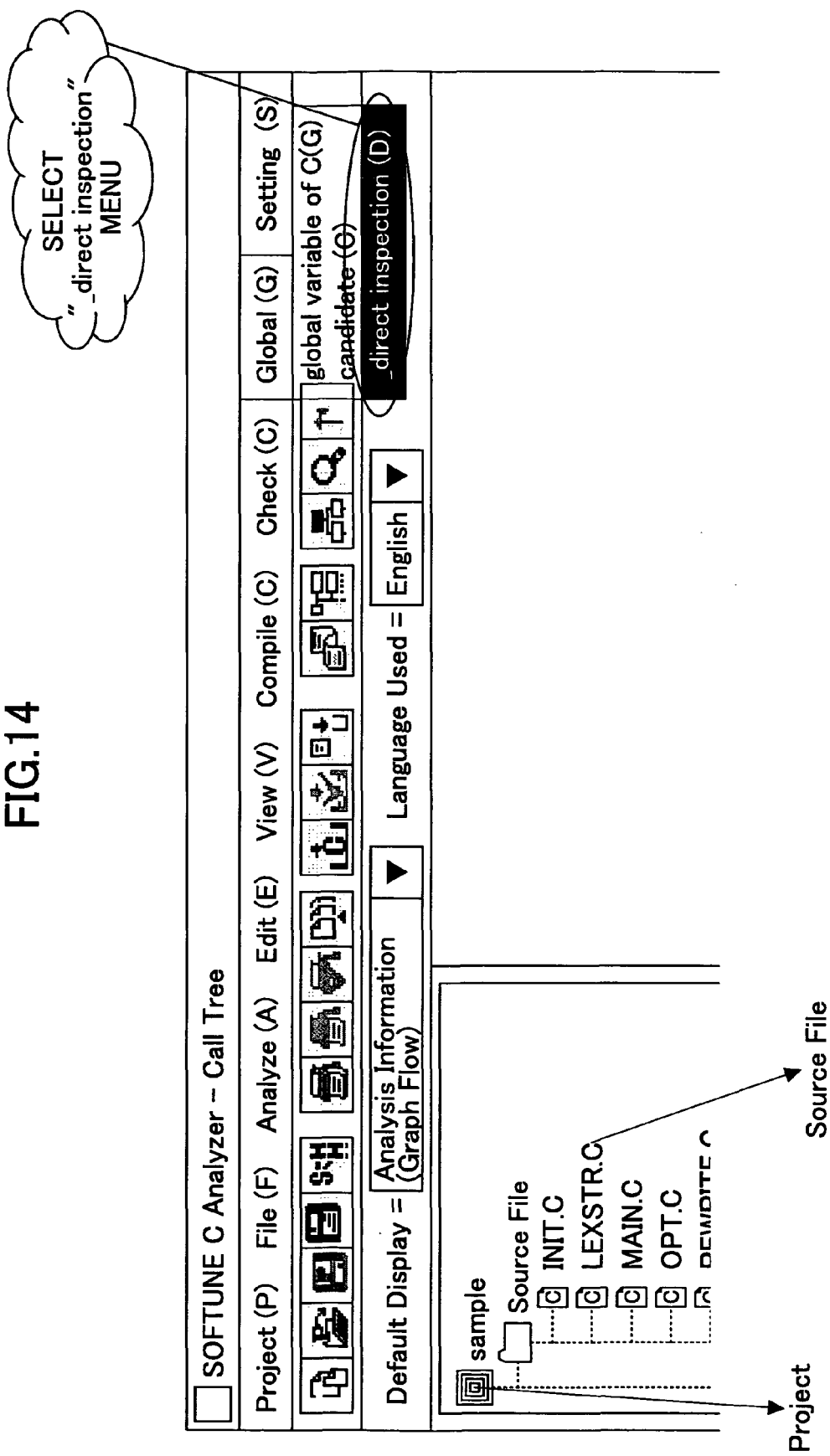
FIG. 14 is a diagram showing a screen on which the analysis of the candidates of the extended language specification are selectable.

FIGS. 14 through 15 are diagrams showing examples of screens displayed on the display part when analyzing the candidate of the extended language specification.

FIG. 14 shows the screen on which the analysis of the candidate of the extended language specification is selectable. In FIG. 14, "sample" indicates the project name, and "INIT.C", "LEXSTRC" and the like indicate the source program names. When a _direct inspection menu is selected on this screen shown in FIG. 14, a _direct inspection window shown in FIG. 15 is displayed on the display part.

The _direct inspection window shown in FIG. 15 includes settings, candidates, static attributes, types, variable names, file names (or program names) and path names. An assignment by the option is indicated when a symbol "*" appears in the setting column. When "Recommended" appears in the candidate column, it is indicated that the assignment by the option is recommended. An assignment within the source program is indicated when "Source" appears in the candidate column. From the indications displayed within the _direct inspection window, it is possible to know whether the assignment is made with respect to a particular variable as a source program and/or as an option.

Figure 16:
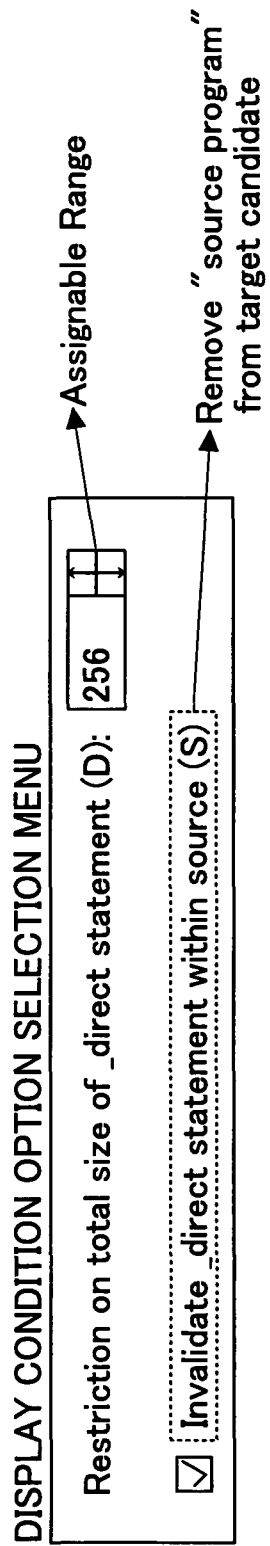
FIG. 16 is a diagram showing a display condition option selection screen.

By setting a numerical value at the top right of a display condition option selection screen shown in FIG. 16, it is possible to set an assignable range shown in FIG. 15. The assignable range is an indication of a range (total size) of the _direct variable, and portions outside the assignable range are unrelated to the _direct variable. In addition, by selecting "Invalidate _direct statement within source (source program)" on the display condition option selection screen shown in FIG. 16, it is possible to remove the source program from the target candidates of the extended language specification.

This application claims the benefit of a Japanese Patent Application No.2005-297866 filed Oct. 12, 2005, in the Japanese Patent Office, the disclosure of which is hereby incorporated by reference.

Further, the present invention is not limited to these embodiments, but various variations and modifications may be made without departing from the scope of the present invention.

What is claimed is:

1. A method of developing a program by assigning an extended language specification with respect to variables and functions included in the program, the method comprising:

gathering, by a computer, first assignment candidate information indicating an assignment of the extended language specification in the program, second assignment candidate information indicating an assignment of the extended language specification in a project including a plurality of programs, and third assignment candidate information indicating an assignment of the extended language specification in an optional setting of a compiler;

storing, by the computer, a list of assigned states of the extended language specification with respect to one or more variables and one or more functions of the programs by analyzing the first assignment candidate information, the second assignment candidate information, and the third assignment candidate information, by assigning a state of the extended language specification to the one or more variables and one or more functions when the one or more variables or functions are contained in a program indicated in the first, second or third assignment candidate information wherein the third assignment candidate information indicates that all variables or functions in all programs or projects to be compiled are assigned the state indicated by the optional setting of the compiler;

determining, by the computer, a final assignment of the extended language specification, so that the assignments of the extended language specification do not overlap with each other with respect to the variables and the functions, based on the list of the assigned states and information related to priorities of assignments with respect to the functions and assignments with respect to the variables;

assigning, by the computer, the extended language specification with respect to the functions or the variables, based on the assigned state final assignment determined by the determining; and creating, by the computer, the programs, by parsing and compiling the functions and the variables to which the extended language specification is assigned according to the assigned extended language specification.

2. The extended language specification assigning method as claimed in claim 1, wherein
the determining carries out a program structure analysis and an extended language analysis,
the program structure analysis includes a function analysis, a variable analysis, and a project analysis, and a result of the program structure analysis is stored as a list of functions, variables, and source programs, and
the extended language analysis includes a syntax analysis and an option analysis, and a result of the extended language analysis is stored as a list of final assignments and candidate assignments.

3. The extended language specification assigning method as claimed in claim 2, wherein the determining adds setting conditions selected from one of language specification conditions, candidate portions, functions, variables, and source programs, to the list of assigned states.

4. The program developing method as claimed in claim 1, wherein the list of assigned states includes variable names, functions, variables commands, and warnings.

5. The program developing method as claimed in claim 4, wherein the warning includes overlap information indicating overlapping assignments of the extended language specification.

6. The program developing method as claimed in claim 1, further comprising:
measuring, by the computer, a performance of the program by executing the program,
wherein the determining changes the functions or the variables to which the extended language specification is assigned in order for a measured result of the measuring to indicate a performance greater than or equal to a tolerable performance.

7. A non-transitory computer-readable storage medium having stored therein a computer program for causing a computer to execute a process of assigning an extended language specification with respect to variables and functions included in a program, the process comprising:

gathering first assignment candidate information indicating an assignment of the extended language specification in the program, second assignment candidate information indicating an assignment of the extended language specification in a project including a plurality of programs, and third assignment candidate information indicating an assignment of the extended language specification in an optional setting of a compiler;

storing a list of assigned states of the extended language specification with respect to one or more variables and one or more functions of the program by analyzing the first assignment candidate information, the second assignment candidate information, and the third assignment candidate information by assigning a state of the extended language specification to the one or more variables and one or more functions when the one or more variables or functions are contained in a program indicated in the first, second or third assignment candidate information wherein the third assignment candidate information indicates that all variables or function in all programs or projects to be compiled are assigned the state indicated by the optional setting of the compiler;

determining a final assignment of the extended language specification so that the assignments of the extended language specification do not overlap with each other with respect to the variables and the functions, based on the list of the assigned states and information related to priorities of assignments with respect to the functions and assignments with respect to the variables;

assigning the extended language specification with respect to the functions or the variables, based on the final assignment determined by the determining; and creating by the computer, the programs by parsing and compiling the functions and the variables to which the extended language specification is assigned according to the assigned extended language specification.

8. The non-transitory computer-readable storage medium as claimed in claim 7, wherein the determining carries out a program structure analysis and an extended language analysis,
the program structure analysis includes a function analysis, a variable analysis, and a project analysis, and a result of the program structure analysis is stored as a list of functions, variables, and source programs, and
the extended language analysis includes a syntax analysis and an option analysis, and a result of the extended language analysis is stored as a list of final assignments and candidate assignments.

9. The non-transitory computer-readable storage medium as claimed in claim 8, wherein the determining adds setting conditions selected from one of language specification conditions, candidate portions, functions, variables, and source programs, to the list of assigned states.

10. The non-transitory computer-readable storage medium as claimed in claim 7, wherein the list of assigned states includes variable names, functions, variables commands, and warnings.

11. The non-transitory computer-readable storage medium as claimed in claim 10, wherein the warning includes overlap information indicating overlapping assignments of the extended language specification.

12. The non-transitory computer-readable storage medium as claimed in claim 7, wherein the process further comprises:
  measuring a performance of the program by executing the program, wherein the determining changes the functions or the variables to which the extended language specification is assigned in order for a measured result of the measuring to indicate a performance greater than or equal to a tolerable performance.

\* \* \* \* \*